United States Patent [19]

Calundann et al.

[11] Patent Number: 4,473,682

[45] Date of Patent: Sep. 25, 1984

[54] MELT PROCESSABLE POLYESTER CAPABLE OF FORMING AN ANISOTROPIC MELT COMPRISING A RELATIVELY LOW CONCENTRATION OF 6-OXY-2-NAPHTHOYL MOIETY, 4-OXYBENZOYL MOIETY, 4,4'-DIOXYBIPHENYL MOIETY, AND TEREPHTHALOYL MOIETY

[75] Inventors: Gordon W. Calundann, North Plainfield; Larry F. Charbonneau, Chatham; Brian C. Benicewicz, Cranford, all of N.J.

[73] Assignee: Celanese Corporation, New York, N.Y.

[21] Appl. No.: 485,820

[22] Filed: Apr. 18, 1983

Related U.S. Application Data

[63] Continuation-in-part of Ser. No. 401,932, Jul. 6, 1982, abandoned.

[51] Int. Cl.³ .............................................. C08G 63/60
[52] U.S. Cl. ..................................... 524/605; 524/601; 524/604; 528/125; 528/128; 528/173; 528/190; 528/191; 528/193; 528/194; 528/271
[58] Field of Search ............... 528/125, 128, 173, 190, 528/191, 193, 194, 271; 524/601, 604, 605

[56] References Cited

U.S. PATENT DOCUMENTS

| | | | |
|---|---|---|---|
| 4,184,996 | 1/1980 | Calundann | 528/190 |
| 4,219,461 | 8/1980 | Calundann | 528/190 |
| 4,256,624 | 3/1981 | Calundann | 528/173 |
| 4,299,756 | 11/1981 | Calundann | 528/173 |
| 4,318,842 | 3/1982 | East et al. | 528/190 |
| 4,337,190 | 6/1982 | Calundann | 528/190 |

*Primary Examiner*—Lester L. Lee
*Attorney, Agent, or Firm*—Burns, Doane, Swecker & Mathis

[57] ABSTRACT

The novel polyester of the present invention is capable of forming an anisotropic melt phase and may be prepared on a relatively economical basis. Such polyester includes a relatively low concentration of 6-oxy-2-naphthoyl moiety in combination with a more substantial concentration of 4-oxybenzoyl moiety. Other key moieties present are 4,4'-dioxybiphenyl moiety and terephthaloyl moiety. The polyester has been found to be capable of undergoing melt extrusion at a sufficiently low temperature to form quality high performance fibers, films, and three-dimensional shaped articles. Such product surprisingly has been found to be capable of exhibiting unusually high modulus characteristics in combination with other desirable properties.

24 Claims, No Drawings

MELT PROCESSABLE POLYESTER CAPABLE OF FORMING AN ANISOTROPIC MELT COMPRISING A RELATIVELY LOW CONCENTRATION OF 6-OXY-2-NAPHTHOYL MOIETY, 4-OXYBENZOYL MOIETY, 4,4'-DIOXYBIPHENYL MOIETY, AND TEREPHTHALOYL MOIETY

CROSS-REFERENCE TO RELATED APPLICATION

This is a continuation-in-part of our U.S. Ser. No. 401,932, filed July 26, 1982, now abandoned.

BACKGROUND OF THE INVENTION

Wholly aromatic polyester resins have long been known. For instance, 4-hydroxybenzoic acid homopolymer and copolymers have been provided in the past and are commercially available. Such polymers commonly are crystalline in nature, relatively high melting or possess a decomposition temperature which is below the melting point, and when molten frequently exhibit an isotropic melt phase. Molding techniques such as compression molding or sintering may be utilized with such materials. Representative publications which discuss these wholly aromatic polyesters include: (a) *Polyesters of Hydroxybenzoic Acids,* by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols)*, by G. Bier, Polymer, Vol. 15, Pages 527 to 535 (August 1974), (c) *Aromatic Polyester Plastics,* by S. G. Cottis, Modern Plastics, Pages 62 and 63 (July 1975), and (d) *Poly(p-Oxybenzoyl Systems)*: *Homopolymer for Coatings: Copolymers for Compression and Injection Molding,* by Roger S. Storm and Steve G. Cottis, Coatings Plast. Preprint, Vol. 34, No. 1, Pages 194 to 197 (April 1974). See also, U.S. Pat. Nos. 3,036,990; 3,039,994; 3,169,121; 3,321,437; 3,553,167; 3,637,595; 3,651,014; 3,662,052; 3,668,300; 3,723,388; 3,759,870; 3,767,621; 3,773,858; 3,787,370; 3,790,528; 3,829,406; 3,857,814; 3,884,876; 3,890,256; 3,974,250; and 3,975,487; U.K. patent application No. 2,058,102A.

In U.S. Pat. No. 3,637,595 a relatively high melting polymer is disclosed which may comprise 4-oxybenzoyl moiety, dioxyaryl moiety (e.g. p,p'-dioxybiphenylene), and terephthaloyl moiety.

It has been disclosed that certain polyesters may be formed which exhibit melt anisotropy. See, for instance, (a) *Polyester X7G-A Self Reinforced Thermoplastic,* by W. J. Jackson, Jr., H. F. Kuhfuss, and T. F. Gray, Jr., 30th Anniversary Technical Conference, 1975 Reinforced Plastics Composites Institute, The Society of the Plastics Industry, Inc., Section 17-D, Pages 1-4; (b) Belgian Pat. Nos. 828,935 and 828,936; (c) Dutch Pat. No. 7505551; (d) West German Nos. 2520819, 2520820, 2722120, 2834535, 2834536 and 2834537; (e) Japanese Nos. 43-223; 2132-116; 3017-692; and 3021-293; (f) U.S. Pat. Nos. 3,991,013; 3,991,014; 4,057,597; 4,066,620; 4,067,852; 4,075,262; 4,083,829; 4,093,595; 4,118,372; 4,130,545; 4,130,702; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,272,625; 4,279,803; 4,284,757; 4,285,852; 4,287,332; 4,294,955; 4,299,756; 4,311,824; 4,314,073; 4,318,841; 4,318,842; 4,332,759; 4,333,907; 4,335,232; 4,337,191; 4,339,375; 4,341,688; 4,346,208; 4,347,349; 4,351,917; 4,351,918; 4,355,132; 4,355,133; 4,355,134; 4,359,569; 4,360,658; 4,362,777; 4,370,466; 4,371,660; 4,374,288; and 4,375,530; (g) U.K. Application No. 2,002,404; (h) British Pat. No. 1,568,541; and (i) European patent application Nos. 24,499 and 45,499.

Representative disclosures of anisotropic melt forming polyesters, poly(ester-amides), or poly(ester-carbonates) which may include 6-oxy-2-naphthoyl moiety are present in U.S. Pat. Nos. 4,161,470; 4,219,461; 4,256,624; 4,279,803; 4,299,756; 4,318,841; 4,318,842; 4,330,457; 4,337,190; 4,347,349; 4,351,917; 4,351,918; 4,355,133; 4,359,569; 4,362,777; 4,371,660; and 4,375,530.

In U.S. Pat. No. 4,219,461 a polyester is disclosed which comprises substantial concentrations of 6-oxy-2-naphthoyl and 4-oxybenzoyl moieties, and symmetrical dioxyaryl and symmetrical dicarboxyaryl moieties. The 6-oxy-2-naphthoyl moieties are provided in a concentration of approximately 20 to 40 mole percent in all instances. Also while a 4,4'-dioxybiphenyl moiety is illustrated, no polymer is exemplified which incorporates this moiety. In the Example the polymer exhibited a substantially lower modulus than that commonly observed with the specifically defined polymer of the present invention.

In U.S. Pat. No. 4,299,756 a polyester is disclosed which comprises 6-oxy-2-naphthoyl moiety, 3-phenyl-4-oxybenzoyl or 2-phenyl-4-oxybenzoyl moiety, 1,3-dioxyphenylene moiety, and terephthaloyl moiety.

In U.S. Pat. No. 4,318,841 a polyester is disclosed which comprises 6-oxy-2-naphthoyl moiety, 4-oxybenzoyl moiety, the non-symmetrical 1,3-dioxyphenylene moiety, and terephthaloyl moiety.

In U.S. Pat. No. 4,370,466 a polyester is disclosed which comprises about 2.5 to 15 mole percent of 6-oxy-2-naphthoyl moiety, about 40 to 70 mole percent of 4-oxybenzoyl moiety, at least about 10 mole percent of 1,3-dioxyphenylene moiety, and at least 10 mole percent of isophthaloyl moiety. The polymer there reported is indicated to exhibit a substantially lower modulus than that commonly observed with the specifically defined polymer of the present invention.

It is an object of the present invention to provide a novel melt processable polyester which forms a highly tractable anisotropic melt phase.

It is an object of the present invention to provide a novel melt processable polyester which forms an anisotropic melt phase and which has been found to be capable of melt extrusion to form quality high performance fibers, films, three-dimensional molded articles, etc.

It is an object of the present invention to provide a novel melt processable polyester which forms a melt phase below approximately 400° C. in the substantial absence of polymer degradation unlike many polymers which include a relatively high concentration of 4-oxybenzoyl moiety.

It is a further object of the present invention to provide a novel melt processable polyester which can commonly be prepared on a more economical basis than that claimed in U.S. Pat. No. 4,219,461 since it includes 6-oxy-2-naphthoyl moiety in a relatively low concentration, and which has been found to be capable of forming products which exhibit an unusually high modulus in combination with other desirable properties (e.g.

strength and retention of properties at elevated temperatures).

These and other objects, as well as the scope, nature and utilization of the invention will be apparent to those skilled in the art from the following detailed description.

SUMMARY OF THE INVENTION

It has been found that a melt processable polyester capable of forming an anisotropic melt phase at a temperature below approximately 400° C. consists essentially of the recurring moieties I, II, III, and IV wherein:

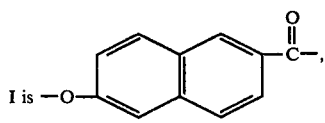

I is —O—

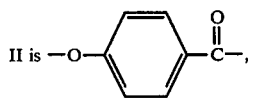

II is —O—

III is —O—

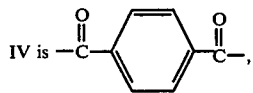

IV is where aromatic rings of moieties III and IV optionally may include substitution of at least some of the hydrogen atoms present upon an aromatic ring selected from the group consisting of an alkyl group of 1 to 4 carbon atoms, an alkoxy group of 1 to 4 carbon atoms, halogen, phenyl, and mixtures of the foregoing, and wherein the polyester comprises approximately 3 to 15 mole percent of moiety I, approximately 20 to 70 mole percent of moiety II, approximately 7.5 to 38.5 mole percent of moiety III, and approximately 7.5 to 38.5 mole percent of moiety IV.

DESCRIPTION OF PREFERRED EMBODIMENTS

The melt processable polyester of the present invention consists essentially of at least four recurring moieties which when combined in the polyester have been found to form an atypical highly tractable anisotropic melt phase at a temperature below approximately 400° C., and preferably below approximately 370° C. (e.g., below approximately 350° C. in a particularly preferred embodiment). The polymer melting temperature may be confirmed by the use of a differential scanning calorimeter (i.e., DSC) employing repeat scans at a 20° C. per minute heat-up rate and observing the peak of the DSC melt transition. The polyester of the present invention may be considered crystalline in the sense that fibers melt extruded therefrom exhibit X-ray diffraction patterns using Ni-filtered CuKα radiation and flat plate cameras characteristic of polymeric crystalline materials. Because of its ability also to exhibit anisotropic properties (i.e., liquid crystalline properties) in the melt, the polyester readily can form a product having a highly oriented molecular structure upon melt processing. Such product has been found to exhibit unusually high modulus characteristics in combination with other desirable properties. Preferred polyesters are capable of undergoing melt processing at a temperature in the range of approximately 320° to 390° C. (e.g., at approximately 345° to 360° C.). The usual difficulties incurred when one attempts to melt process many aromatic polyesters by conventional melt processing techniques effectively are eliminated.

The first essential unit (i.e., moiety I) of the polyester of the present invention is a 6-oxy-2-naphthoyl moiety of the structural formula:

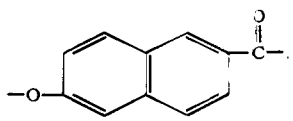

Such moiety is free of aromatic ring substitution and is present in a relatively low concentration as discussed hereafter.

As will be apparent to those skilled in the art, moiety I can be derived from unsubstituted 6-hydroxy-2-naphthoic acid and the derivatives thereof. A convenient laboratory preparation for forming 6-hydroxy-2-naphthoic acid is described in Berichte, Vol. 58, 2835-45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of beta-naphthol. Additionally, see U.S. Pat. No. 4,287,357.

Moiety I comprises approximately 3 to 15 mole percent of the polyester. In a preferred embodiment moiety I is present in a concentration of approximately 5 to 10 mole percent (e.g., approximately 5 or 10 mole percent).

The presence of moiety I in the polyester of the present invention even in such low concentrations has been found to significantly lower the melting or softening temperature of the resulting polyester thereby making possible the use of more conventional melt extrusion equipment and processing conditions than would otherwise be required. For instance, if moiety I were eliminated and the concentrations of the other moieties correspondingly increased, the melting temperature of the resulting polyester commonly would be approximately 30° to 80° C. higher. Such lowering of the melting temperature in the polyester of the present invention is accomplished in combination with the ability to form a highly tractable anisotropic melt. Moiety I while significantly contributing to the properties of the resulting polyester does not contribute substantially to the overall cost for producing such polyester in view of its relatively low concentration.

The second essential moiety (i.e., moiety II) of the polyester of the present invention is a 4-oxybenzoyl moiety of the structural formula:

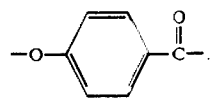

Such moiety is free of ring substitution and is present in a substantial concentration. Moiety II may be derived from unsubstituted p-hydroxybenzoic acid or its derivatives. Moiety II is present in a concentration of 20 to 70 mole percent. In a preferred embodiment moiety II is present in a concentration of approximately 50 to 65 mole percent (e.g., 50 to 60 mole percent).

The third essential moiety (i.e., moiety III) of the polyester of the present invention is a symmetrical dioxyaryl moiety of the formula:

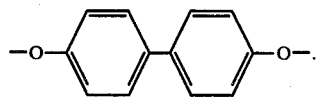

Moiety III conveniently may be derived from p,p'-biphenol or its derivatives.

Moiety III optionally may include substitution of at least some of the hydrogen atoms present upon an aromatic ring selected from the group consisting of an alkyl group of 1 to 4 carbon atoms, an alkoxy group of 1 to 4 carbon atoms, halogen, phenyl, and mixtures of the foregoing. If the optional substitution of moiety III is a phenyl group which itself is substituted, the substituents present on such phenyl group may be an alkyl group of 1 to 4 carbon atoms, an alkoxy group of 1 to 4 carbon atoms, halogen, phenyl, and mixtures of these. In a preferred embodiment moiety III is free of ring substitution and the concomitant expense associated therewith.

Moiety III is present in the polyester of the present invention in a concentration of approximately 7.5 to 38.5 mole percent, and preferably in a concentration of approximately 12.5 to 22.5 mole percent (e.g., 17.5 or 20 mole percent).

The fourth essential moiety (i.e., moiety IV) of the polyester of the present invention is a symmetrical dicarboxyaryl moiety of the formula:

Moiety IV conveniently may be derived from terephthalic acid or its derivatives.

Moiety IV optionally may include substitution of at least some of the hydrogen atoms present upon the aromatic ring selected from the group consisting of an alkyl group of 1 to 4 carbon atoms, an alkoxy group of 1 to 4 carbon atoms, halogen, phenyl, and mixtures of the foregoing. If the optional substitution of moiety IV is a phenyl group which itself is substituted, the substituents present on such phenyl group may be an alkyl group of 1 to 4 carbon atoms, an alkoxy group of 1 to 4 carbon groups, halogen, phenyl, and mixtures of these. In a preferred embodiment moiety IV is free of ring substitution and the concomitant expense associated therewith.

Moiety IV is present in the polyester of the present invention in a concentration of approximately 7.5 to 38.5 mole percent, and preferably in a concentration of approximately 12.5 to 22.5 mole percent (e.g., 17.5 or 20 mole percent).

Other ester-forming moieties (e.g., dioxy units, dicarboxy units and/or other combined oxy and carboxy units) than those specified for moieties I, II, III and IV additionally may be included in the polyester of the present invention in a minor concentration. Representative additional ester-forming moieties may be derived from hydroquinone, isophthalic acid, substituted hydroxynaphthoic acid, m-hydroxybenzoic acid, substituted hydroxybenzoic acids, cycloaliphatic dicarboxylic acids, etc. Amide-forming moieties also may be included in the polyester of the present invention in a minor concentration. Representative reactants which may form such amide-forming moieties include m-aminophenol, p-aminophenol, m-aminobenzoic acid, p-aminobenzoic acid, m-phenylenediamine, p-phenylenediamine, etc. The additional ester-forming moieties and/or amide-forming moieties optionally may be included in the polyester of the present invention so long as such moieties do not raise the melting temperature of the resulting polymer above that specified, or do not otherwise interfere with the exhibition of the desired anisotropic properties in the melt. The total minor concentration of such additional ester-forming and amide-forming moieties if present generally will be less than 10 mole percent of the total polymer.

A representative example of a highly satisfactory polyester which incorporates 1,4-dioxyphenylene moiety derived from hydroquinone as a fifth component comprises approximately 5 mole percent of 6-oxy-2-naphthoyl moiety, 60 mole percent 4-oxybenzoyl moiety, 8.75 mole percent of 4,4'-dioxybiphenol moiety, 17.5 mole percent of terephthaloyl moiety, and 8.75 mole percent of 1,4-dioxyphenylene moiety.

The polyester of the present invention is preferably "wholly aromatic" in the sense that each moiety present contributes at least one aromatic ring to the main polymer chain.

The polyester of the present invention commonly exhibits

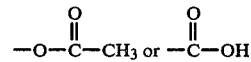

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

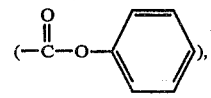

and methylester

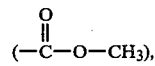

optionally may be included at the end of the polymer chains. The polymer also may be oxidatively cross-linked to at least some degree, if desired, by heating in an oxygen-containing atmosphere (e.g., in air) while in bulk form or as a previously shaped article at a temperature below its melting point for a limited period of time (e.g., for a few minutes).

The polyester of the present invention tends to be substantially insoluble in all common polyester solvents, such as hexafluoroisopropanol and o-chlorophenol, and accordingly is not susceptible to solution processing. It can surprisingly be readily processed by common melt processing techniques as discussed hereafter. Most compositions are soluble in pentafluorophenol.

The wholly aromatic polyester of the present invention commonly exhibits a weight average molecular weight of about 2,000 to 200,000, and preferably about 10,000 to 50,000 (e.g., about 20,000 to 25,000). Such molecular weight may be determined by standard techniques not involving the solutioning of the polymer (e.g., by end group determination via infra red spectroscopy on compression molded films). Alternatively, light scattering techniques in a pentafluorophenol solution may be employed to determine the molecular weight.

The polyester prior to heat treatment additionally commonly exhibits an inherent viscosity (i.e., I.V.) of at least 0.6, and preferably at least 1.0 (e.g., approximately 2 to 8 or more) when dissolved in a concentration of 0.1 percent by weight in pentafluorophenol at 60° C. In a particularly preferred embodiment the polyester of the present invention exhibits an inherent viscosity in the range of approximately 6 to 9 when dissolved in a concentration of 0.1 percent by weight in pentafluorophenol at 60° C. Alternatively, the inherent viscosity of the polyester may be determined while dissolved in a 1:1 solution of pentafluorophenol:hexafluoroisopropanol in a concentration of 0.1 percent (W/V) at 25° C. This alternate technique offers the possibility of automation while operating at room temperature; however, it tends to yield numerical values which are higher than those obtained with a 0.1 percent solution in pentafluorophenol at 60° C. For instance, such values with the mixed solvent may be on the order of approximately 10 percent higher than those obtained with pentafluorophenol at 60° C.

The polyester of the present invention prior to heat treatment preferably also exhibits a melt viscosity in the range of approximately 800 to 1500 poise at 370° C. and a shear rate of 10 sec.$^{-1}$. Such determination conveniently may be carried out using a commercially available Rheometrics mechanical spectrometer.

Unlike the aromatic polyesters commonly encountered in much of the prior art, the polyester of the present invention is not intractable and forms an anisotropic melt phase whereby an atypical degree of order is manifest in the molten polymer. The subject polyester readily forms liquid crystals in the melt phase and accordingly exhibits a high tendency for the polymer chains to orient in the shear direction. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40× with the sample on a Leitz hot stage and under a nitrogen atmosphere. The polymer melt is optically anisotropic, i.e., it transmits light when examined between crossed polarizers. The amount of light transmitted increases when the sample is sheared (i.e., is made to flow); however, the sample is optically anisotropic even in the static state.

The polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a largely melt solution of the reactants wherein some reactants such as terephthlic acid initially are present to some degree as solids. Low levels of terephthalic acid may dissolve under such circumstances. The polymer product sometimes is suspended therein as solid polymer particles. A vacuum may be applied to facilitate removal of volatiles formed during the final stage of the condensation (e.g., acetic acid or water) and to otherwise expedite the polymerization.

In commonly assigned U.S. Pat. No. 4,067,852 of Gordon W. Calundann, entitled "Melt Processable Thermotropic Wholly Aromatic Polyester Containing Polyoxybenzoyl Units" is described another slurry polymerization process which may be employed to form the polyester of the present invention wherein the solid product is suspended in a heat exchange medium. The disclosure of this patent is herein incorporated by reference.

When employing either the melt acidolysis procedure or the slurry procedure of U.S. Pat. No. 4,067,852 the organic monomer reactants from which moieties I, II, and III are derived may be initially provided in a modified form whereby the hydroxyl groups of these monomers are esterified (i.e., they are provided as acyl esters). The lower acyl groups preferably have from about 2 to about 4 carbon atoms. Preferably the acetate esters of the organic compounds which form moieties I, II, and III are provided. Accordingly, particularly preferred reactants for the condensation reaction are 6-acetoxy-2-naphthoic acid, 4-acetoxybenzoic acid, and 4,4'-biphenol diacetate (i.e., 4,4'-diacetoxybiphenyl). If 1,4-dioxyphenylene moiety additionally is present as an optional moiety the preferred reactant is hydroquinone diacetate.

Representative catalysts which optionally may be employed in either the melt acidolysis procedure or in the procedure of U.S. Pat. No. 4,067,852 include dialkyl tin oxide (e.g., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The molecular weight of a previously formed polyester may be further increased via a solid state polymerization procedure wherein the particulate polymer is heated in an inert atmosphere (e.g., in a nitrogen atomsphere) at a temperature of about 240° C. for 10 to 12 hours.

The polyester of the present invention readily can be melt processed in the substantial absence of polymer degradation to form a variety of relatively stiff shaped articles e.g., molded three-dimensional articles, fibers, films, tapes, etc.). The polyester of the present invention is suited for molding applications and may be molded via standard injection molding techniques commonly utilized when forming molded articles. Unlike the polyesters commonly encountered in the prior art it is not essential that more severe injection molding conditions (e.g., higher temperatures), compression molding, impact molding, or plasma spraying techniques be utilized. Fibers or films may be melt extruded.

A molding compound may be formed from the polyester of the present invention which incorporates approximately 1 to 60 percent by a weight of a solid filler (e.g., talc) and/or reinforcing agent (e.g., glass fibers).

The polyester of the present invention also may be employed as a coating material which is applied as a powder or from a liquid dispersion.

When forming fibers and films the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material, the spinneret selected may contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of about 1 to 70 mils (e.g., 5 to 40 mils) may be utilized. Yarns of about 20 to 200 continuous filaments are commonly formed. The melt-spinnable polyester is supplied to the extrusion orifice at a temperature above its melting point (e.g., at a temperature of about 320° to 390° C.), and at a temperature of about 345° to 360° C. in a preferred embodiment.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have denier per filament of about 1 to 50, and preferably a denier filament of about 1 to 20.

The resulting filamentary material or film optionally may be subjected to a thermal treatment whereby its physical properties are further enhanced. The tenacity of the fiber or film may be increased by such thermal treatment. More specifically, the fibers or films may be thermally treated in an inert atmosphere (e.g., nitrogen, argon, helium) or in a flowing oxygen-containing atmosphere (e.g., air) with or without stress at a temperature below the polymer melting point until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 270° C. for 8 hours and at 280° C. for 15 hours. Alternatively, the fiber may be heated at about 15° to 20° C. below the temperature at which it melts for about 24 hours. Optimum heat treatment conditions will vary with the specific composition of the polyester and with the fiber's process history.

The as-spun fibers formed from the polyester of the present invention are fully oriented and exhibit highly satisfactory physical properties which render them suitable for use in high performance applications. The as-spun fibers commonly exhibit an average single filament tenacity of at least 5 grams per denier (e.g., about 5 to 15 grams per denier), and an average single filament tensile modulus or initial modulus of at least about 300 grams per denier (e.g., about 300 to 1,000 grams per denier, and preferably at least 500 or 600 or more grams per denier). Such properties are further enhanced by thermal treatment as previously indicated and enable the fibers to be used with particular advantage as tire cords and in other industrial applications, such as conveyor belts, hose, cabling, resin reinforcement, etc. Following heat treatment the fibers in preferred embodiments exhibit a tensile modulus or initial modulus of at least 750 grams per denier and most preferably at least 900 grams per denier. Films formed of the polyester of the present invention may be used as strapping tape, cable wrap, magnetic tape, electric motor dielectric film, etc. The fibers and films exhibit an inherent resistance to burning and a good retention of properties at elevated temperatures.

The following examples are presented as specific illustrations of the claimed invention. It should be understood, however, that the invention is not limited to the specific details set forth in the examples.

EXAMPLE 1

To a 300 ml. three-neck round bottom flask equipped with a sealed paddle stirrer, gas inlet tube, and a distillation head connected to a condenser were added the following:

(a) 11.5 grams of 6-acetoxy-2-naphthoic acid (0.05 mole);
(b) 45.0 grams of 4-acetoxybenzoic acid (0.25 mole);
(c) 27.3 grams of 4,4'-diacetoxybiphenyl (0.10 mole);
(d) 16.6 grams of terephthalic acid (0.10 mole); and
(e) 0.02 gram of sodium acetate catalyst.

The flask was thoroughly purged of oxygen by evacuation and refilling with dry argon three times, and was heated in a fluidized sand bath under a slow stream of argon.

The contents of the flask were initially heated with stirring to 240° C. over a period of 45 minutes, and to 250° C. over a period of 5 minutes, and were maintained at 250° C. for 50 minutes. Next the contents were heated from 250° C. to 340° C. over a period of 75 minutes and from 340° C. to 380° C. over a period of 15 minutes. Finally the flask was evacuated to a pressure of 0.96 Torr for 15 minutes at 380° C. The vacuum was released with dry argon, and the contents of the flask were allowed to cool.

The inherent viscosity (I.V.) of the polymer was approximately 5.53 as determined in a pentafluorophenol solution of 0.1 percent by weight concentration at 60° C. in accordance with the equation:

$$I.V. = \frac{\ln (\eta \text{ rel})}{c},$$

where c=concentration of solution (0.1 percent by weight), and $\eta$ rel=relative viscosity. When the polymer was subjected to differential scanning calorimetry (20° C./min. heating rate), it exhibited a melt endotherm peak at 312° C. The polymer melt was optically anisotropic.

The powdered polymer was dried in a vacuum oven, and while molten and at a temperature of 330° C. was extruded through a single hole spinneret (0.127 mm. diameter×0.178 mm.) at a throughput rate of 0.39 gram/minute. The as-spun filament was quenched in ambient air (i.e., at 72° F. and 65 percent relative humidity) prior to windup at a speed of 800 meters/minute.

A section of the resulting as-spun polyester fiber had a denier of 4.4 and exhibited the following average single filament properties:

Tenacity (grams per denier): 7.9
Initial modulus (grams per denier): 605
Elongation (percent): 1.5
Following thermal treatment in a dry nitrogen flow at 280° C. for 15 hours the fiber exhibited the following single filament properties:
Tenacity (grams per denier): 22.5
Initial modulus (grams per denier): 758
Elongation (percent): 3.1.

The physical properties were determined in accordance with the standard ASTM testing procedure D3822.

EXAMPLE 2

To a 300 ml. three-neck round bottom flask equipped with a sealed padded stirrer, gas inlet tube, four inch Vigreaux column with distilling head, condenser and graduated cylinder were added the following:
(a) 5.87 grams of 6-acetoxy-2-naphthoic acid (0.025 mole);
(b) 55.16 grams of 4-acetoxybenzoic acid (0.306 mole);
(c) 24.13 grams of 4,4'-biphenol diacetate (0.088 mole);
(d) 14.83 grams of terephthalic acid (0.089 mole); and
(e) 0.0025 gram of potassium acetate catalyst.
The flask was thoroughly purged of oxygen by evacuation and refilling with dry nitrogen three times, and was heated under a slow stream of nitrogen.

The contents of the flask were initially heated with stirring from room temperature to 230° C. over a period of 50 minutes during which time the monomers substantially melted. The contents were heated from 230° C. to 360° C. over a period of 210 minutes, and were heated for 15 minutes at 360° C. at which temperature the flask was evacuated to a pressure of 1 Torr. The vacuum was then released with dry nitrogen, and the contents of the flask were allowed to cool to room temperature.

The inherent viscosity (I.V.) of the polymer was approximately 7.04 as determined in a 1:1 pentafluorophenol:hexafluoroisopropanol solution of 0.1 percent (W/V) concentration at 25° C. Also, the melt viscosity of the resulting polymer was 400 poise at 370° C. when measured in a Rheometrics mechanical spectrometer at a shear rate of 10 sec.$^{-1}$. When the polymer was subjected to differential scanning calorimetry (20° C./min. heating rate), it exhibited a melt endotherm peak at 337° C. The polymer melt was optically anisotropic.

The remaining polymer while molten and at a temperature of 345° C. was extruded through a single hole spinneret (0.005 inch diameter ×0.007 inch) at a throughput rate of 0.42 gram/minute. The as-spun filament was quenched in ambient air (i.e., at 72° F. and 65 percent relative humidity) prior to windup at a speed of 800 meters/minute.

A section of the resulting as-spun polyester fiber had a denier of 5 and exhibited the following average single filament properties:
Tenacity (grams per denier): 8.3
Initial modulus (grams per denier): 606
Elongation (percent): 1.48
Following heat treatment in a flowing dry nitrogen atmosphere (50 SCFH) at 300° C. for 8 hours the fiber exhibited the following average single filament properties:
Tenacity (grams per denier): 25.8
Initial modulus (grams per denier): 952
Elongation (percent): 2.6.

EXAMPLES 3 TO 10

Example 2 was substantially repeated with the exceptions indicated. More specifically, the final polymerization temperature was varied (i.e., 360° C., 370° C., or 380° C.), the quantity of potassium acetate catalyst was varied (i.e., 0.0025 gram, 0.0100 gram, or 0.0175 gram), and the time while heated at the final polymerization temperature under a pressure of 1 Torr was varied (i.e., 15 minutes, 37.5 minutes, or 60 minutes). The melt extrusion temperature utilized in each instance is as indicated hereafter (i.e., 360° C. or 375° C.).

The polymerization conditions, the peak temperature by differential scanning calorimetry, the inherent viscosity, and the melt viscosity are reported below:

| Example No. | Final Polymerization Temperature (°C.) | Time at Final Polymerization Temperature Under 1 Torr (minutes) | Quantity of Catalyst (gram) | Differential Scanning Calorimetry Peak Temperature (°C.) | Inherent Viscosity as Determined in Ex. 2 | Melt Viscosity as Determined in Ex. 2 (poise) |
|---|---|---|---|---|---|---|
| 3 | 380 | 15 | 0.0025 | 335 | 10.3 | 700 |
| 4 | 360 | 15 | 0.0175 | 340 | 7.6 | 700 |
| 5 | 380 | 15 | 0.0175 | 342 | 1.4 | 3,000 |
| 6 | 360 | 60 | 0.0025 | 342 | 3.1 | 2,000 |
| 7 | 380 | 60 | 0.0025 | 347 | 6.0 | 30,000 |
| 8 | 360 | 60 | 0.0175 | 353 | 12.9 | 20,000 |
| 9 | 380 | 60 | 0.0175 | 346 | 3.5 | 00,000 |
| 10 | 370 | 37.5 | 0.0100 | 341 | 3.5 | 200 |

The melt extrusion temperatures, and the average single filament properties before and after heat treatment are reported below:

| | | As-Spun Properties | | | Heat Treated Properties | | |
|---|---|---|---|---|---|---|---|
| Example No. | Melt Extrusion Temperature (°C.) | Tenacity (grams per denier) | Initial Modulus Elongation per denier | Elongation (percent) | Tenacity (grams per denier) | Initial Modulus Elongation per denier | Elongation (percent) |
| 3 | 375 | 7.8 | 570 | 1.5 | 22.4 | 368 | 2.36 |
| 4 | 360 | 8.4 | 650 | 1.4 | 23.9 | 047 | .33 |
| 5 | 375 | 4.7 | 480 | 1.1 | 3.0 | 385 | .0 |
| 6 | 360 | 6.5 | 552 | 1.2 | 3.9 | 307 | .54 |
| 7 | not spun | — | — | — | — | — | — |
| 8 | 375 | 4.9 | 453 | 1.1 | 3.7 | 724 | 2 |

-continued

| Example No. | Melt Extrusion Temperature (°C.) | As-Spun Properties ||| Heat Treated Properties |||
|---|---|---|---|---|---|---|---|
| | | Tenacity (grams per denier) | Initial Modulus Elonagation per denier) | (grams (percent) | Tenacity (grams per denier) | Initial Modulus Elongation per denier) | (percent) |
| 9 | 375 | 1.5 | 339 | 0.5 | 1.7 | 429 | 0.4 |
| 10 | 360 | 8.3 | 608 | 1.5 | 23.9 | 986 | 2.46 |

The polymer of Example 7 could not be spun at a temperature below 390° C. and possessed an excessively high melt viscosity at 370° C. The polymer of Example 9 also possessed an excessively high melt viscosity. The products of Examples 4 and 10 were considered to be superior and yielded heat treated fiber tenacities in excess of 20 grams per denier and heat treated fiber initial modulus values approximating 1,000 grams per denier.

EXAMPLES 11 TO 16

Example 2 was substantially repeated with the exceptions indicated. More specifically, the concentration of 6-oxy-2-naphthoyl moiety in the resulting polymer was maintained constant at 5 mole percent, and the concentrations of the other three essential moieties were varied as indicated. Also, the pressure employed during final polymerization step was either 1 Torr or 100 Torr as indicated while conducting the final polymerization step at 370° C. for 37.5 minutes. The inherent viscosity of the products in each instance and peak temperatures by differential scanning calorimetry are reported below:

The melt extrusion temperatures, and the average single filament properties before and after heat treatment are reported below:

| Example No. | Melt Extrusion Temperature (°C.) | As-Spun Properties ||| Heat Treated Properties |||
|---|---|---|---|---|---|---|---|
| | | Tenacity (grams per denier) | Initial Modulus (grams per denier) | Elongation (percent) | Tenacity (grams per denier) | Initial Modulus (grams per denier) | Elongation (percent) |
| 11 | 375 | 4.9 | 550 | 1.0 | 8.5 | 740 | 1.07 |
| 12 | 360 | 5.3 | 615 | 1.0 | 18.2 | 855 | 2.0 |
| 13 | 345 | 7.2 | 597 | 1.33 | 27.2 | 1,079 | 2.57 |
| 14 | 345 | 8.1 | 638 | 1.41 | 27.1 | 1,059 | 2.67 |
| 15 | 360 | 8.4 | 621 | 1.54 | 24.8 | 1,077 | 2.38 |
| 16 | 375 | 6.8 | 592 | 1.30 | 15.0 | 886 | 1.63 |

The products of Examples 13 and 14 were considered to be superior and yielded heat treated fiber tenacities in excess of 25 grams per denier, and heat treated fiber initial modulus values in excess of 1,000 grams per denier.

EXAMPLES 17 TO 21

Example 2 was substantially repeated with the exceptions indicated. More specifically, the polymerization was carried out using either sodium acetate and/or potassium acetate as catalyst in the quantities indicated, and with or without the addition of small amounts of acetic acid and acetic anhydride. The final polymerization step was carried out at 370° C. for 37 minutes while under a pressure of 100 Torr. The variable polymerization conditions are reported below together with the inherent viscosity and the peak temperature by differential scanning calorimetry of the resulting products:

| Example No. | Molar Percent of Moieties in Product |||| Pressure at Final Polymerization Temperature (Torr) | Inherent Viscosity as Determined in Ex. 2 | Differential Scanning Calorimetry Peak Temperature (°C.) |
|---|---|---|---|---|---|---|---|
| | 6-oxy-2-naphthoyl | 4-oxy-benzoyl | 4,4'-dioxy-biphenyl | tere-phthaloyl | | | |
| 11 | 5 | 45 | 25 | 25 | 1 | 8.6 | 370 |
| 12 | 5 | 50 | 22.5 | 22.5 | 1 | 4.6 | 345 |
| 13 | 5 | 55 | 20 | 20 | 100 | 5.8 | 346 |
| 14 | 5 | 60 | 17.5 | 17.5 | 100 | 6.21 | 339 |
| 15 | 5 | 65 | 15 | 15 | 100 | 8.1 | 337 |
| 16 | 5 | 70 | 12.5 | 12.5 | 100 | 8.1 | 339 |

| Example No. | Sodium Acetate Catalyst (ppm) | Potassium Acetate Catalyst (ppm) | Acetic Acid Added (molar %) | Acetic Anhydride Added (molar %) | Inherent Viscosity as Determined in Ex. 2 | Differential Scanning Calorimetry Peak Temperature °C. |
|---|---|---|---|---|---|---|
| 17 | 100 | 0 | 0 | 0 | 5.6 | 322 |
| 18 | 0 | 100 | 0 | 0 | 6.5 | 340 |
| 19 | 100 | 0 | 3 | 3 | 6.7 | 330 |
| 20 | 0 | 100 | 3 | 3 | 9.4 | 343 |

-continued

| Example No. | Sodium Acetate Catalyst (ppm) | Potassium Acetate Catalyst (ppm) | Acetic Acid Added (molar %) | Acetic Anhydride Added (molar %) | Inherent Viscosity as Determined in Ex. 2 | Differential Scanning Calorimetry Peak Temperature °C. |
|---|---|---|---|---|---|---|
| 21 | 50 | 50 | 1.5 | 1.5 | 6.9 | 334 |

The melt extrusion temperatures and the average single filament properties before and after heat treatment are reported hereafter. The heat treatment values which are reported in the table which immediately follows were obtained by heating a portion of the as-spun fibers in a nitrogen atmosphere provided at 300° C. for 8 hours.

| | | As-Spun Properties | | | Heat Treated Properties (300°C. for 8 hours in $N_2$) | | |
|---|---|---|---|---|---|---|---|
| Example No. | Melt Extrusion Temperature (°C.) | Tenacity (grams per denier) | Initial Modulus (grams per denier) | Elongation (percent) | Tenacity (grams per denier) | Initial Modulus (grams per denier) | Elongation (percent) |
| 17 | 345 | 6.8 | 610 | 1.21 | 23.3 | 916 | 2.87 |
| 18 | 360 | 7.9 | 634 | 1.53 | 26.4 | 950 | 2.87 |
| 19 | 360 | 8.6 | 558 | 1.57 | 26.5 | 886 | 3.06 |
| 20 | 345 | 9.4 | 594 | 1.72 | 26.3 | 958 | 2.78 |
| 21 | 345 | 7.72 | 664 | 1.44 | 30.1 | 944 | 3.33 |

A portion of the as-spun fibers from Examples 17 to 21 were next heat treated employing different heat treatment conditions. More specifically, the as-spun fibers which had previously undergone no heat treatment were heated in a nitrogen atmosphere for 1 hour at 300° C. and for 1 hour at 310° C. These samples are designated in Example Nos. 17a to 21a and the values are reported hereafter.

| | Heat Treated Properties (300° C. for 1 hr. + 310° C. for 1 hr. in $N_2$) | | |
|---|---|---|---|
| Example No. | Tenacity (grams per denier) | Initial Modulus (grams per denier) | Elongation (percent) |
| 17a | 22.7 | 994 | 2.23 |
| 18a | 27.8 | 1,110 | 2.6 |
| 19a | 23.8 | 963 | 2.36 |
| 20a | 26.6 | 1,018 | 2.53 |
| 21a | 28.0 | 1,036 | 2.64 |

The products of Examples 18, 18a, 20, 20a, 21 and 21a were considered to be superior.

EXAMPLE 22

To a 5 gallon 316 stainless steel autoclave equipped with a sealed stirrer, gas inlet tube, and distillation head connected to a condenser were added the following:
(a) 898 grams of 6-acetoxy-2-naphthoic acid (3.9 moles),
(b) 8,270 grams of 4-acetoxybenzoic acid (45.9 mole),
(c) 3,620 grams of 4,4'-biphenol diacetate (13.3 mole),
(d) 2,225 grams of terephthalic acid (13.4 mole), and
(e) 1.5 gram of potassium acetate catalyst.
The autoclave was thoroughly purged of oxygen by evacuation and refilling with nitrogen three times. Thereafter a nitrogen flow of 4 SCFH was passed through the autoclave.

The hot oil jacket in the autoclave was raised to 260° C. When the contents of the autoclave reached 200° C., the temperature of the hot oil jacket was raised to 290° C. and held at that temperature for 1 hour, raised to 320° C. and held at that temperature for one-half hour, and then raised to 370° C. for the remainder of the polymerization. When the polymerization melt reached approximately 360° C., the nitrogen purge was terminated, and a 100 Torr pressure was placed upon the reactor until a reactor torque comparable to 1,750 poise (Instron rheometer, 10 sec.$^{-1}$, 370° C., 4 inch×0.03 inch die) was obtained. The autoclave next was pressurized to 30 psi with nitrogen, and a polymer strand was extruded into water, and was pelletized. The polymer pellets were dried at 130° C. for 16 hours.

While using an Arburg Model 221E/150 injection molding machine with an 18 mm. barrel, tensile and flexural test specimens were molded at 340° C. The tensile bars had a cross-section of 1/16 inch×⅜ inch, and the flexural bars had a cross-section of ⅛ inch×½ inch. Flexural testing was conducted at room temperature on an Instron Testing Unit according to ASTM D790. Tensile testing was conducted using Type V tensile bars according to ASTM D638. Izod impact was determined using ASTM D256. Heat deflection testing was determined using flexural bars set on edge according to ASTM D648.

Tensile Properties

Modulus: 1,590,000 psi
Strength: 27,200 psi
Elongation: 2.6 percent

Flexural Properties

Modulus: 1,200,000 psi
Strength: 17,600 psi

Izod Impact 5.3 ft. lb./in.

Heat Deflection Temperature

433° F. at 264 psi.

EXAMPLE 23

The polymer preparation portion of Example 22 was substantially repeated with the exceptions indicated. After the initial nitrogen purging, 150 grams of acetic anhydride were added through a liquid additions port to the autoclave. Also, the polymerization was terminated when a reactor torque comparable to 1,000 poise (Instron rheometer, 10 sec.$^{-1}$, 370° C., 4 inch×0.03 inch die) was obtained. The polymer exhibited an inherent viscosity of 8.65 as determined in Example 2.

The polymer was melt extruded through a 31 hole spinneret while at a temperature of 352° C. The holes of the spinneret measured 0.005 inch×0.007 inch. The polymer throughput was 0.85 gram/hole/minute, and the resulting yarn was taken up at a rate of 1,530 meters per minute.

The resulting as-spun fibers exhibited the following average single filament properties:
Tenacity (grams per denier): 7.8
Initial Modulus (grams per denier): 600
Elongation (percent): 1.4
Following thermal treatment in a dry nitrogen flow at 300° C. for 8 hours the fiber exhibited the following average single filament properties:
Tenacity (grams per denier): 24.7
Initial Modulus (grams per denier): 965
Elongation (percent): 2.4.

EXAMPLES 24 AND 25

Example 18 was substantially repeated with the exception that the relative quantities of the reactants were varied with the 6-oxy-2-naphthoyl moiety being provided a molar concentration of 3 percent. The relative molar concentrations of the moieties, and the inherent viscosities, and differential scanning calorimetry peak temperatures of the product are reported below:

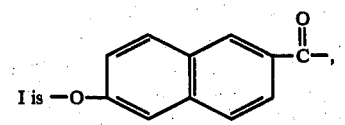

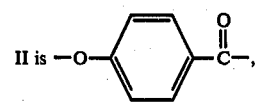

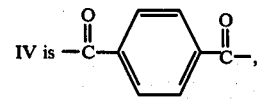

where aromatic rings of moieties III and IV optionally may include substitution of at least some of the hydrogen atoms present upon an aromatic ring selected from the group consisting of an alkyl group of 1 to 4 carbon atoms, an alkoxy group of 1 to 4 carbon atoms, halogen, phenyl, and mixtures of the foregoing, and wherein said polyester comprises approximately 3 to 10 mole percent of moiety I, approximately 20 to 70 mole percent of

| | Molar Percent of Moieties in Product | | | | Inherent Viscosity as Determined in Ex. 2 | Differential Scanning Calorimetry Peak Temperature (°C.) |
|---|---|---|---|---|---|---|
| Example No. | 6-oxy-2-naphthoyl | 4-oxy-benzoyl | 4,4'-dioxy biphenyl | terephthaloyl | | |
| 24 | 3 | 62 | 17.5 | 17.5 | 7.62 | 354 |
| 25 | 3 | 57 | 20 | 20 | 8.25 | 371 |

The melt extrusion temperatures and the average single filament properties before and after heat treatment are reported hereafter. The as-spun denier of the fiber in each instance was 5. The heat treatment values which are reported in the table which follows were obtained by heating the as-spun fibers in a nitrogen atmosphere at 300° C. for 8 hours.

moiety II, approximately 7.5 to 38.5 mole percent of moiety III, and approximately 7.5 to 38.5 mole percent of moiety IV.

2. A melt processable polyester according to claim 1 which is capable of forming an anisotropic melt phase at a temperature below approximately 370° C.

3. A melt processable polyester according to claim 1

| | | As-Spun Properies | | | Heat Treated Properties | | |
|---|---|---|---|---|---|---|---|
| Example No. | Melt Extrusion Temperature (°C.) | Tenacity (grams per denier) | Initial Modulus (grams per denier) | Elongation (percent) | Tenacity (grams per denier) | Initial Modulus (grams per denier) | Elongation (percent) |
| 24 | 360 | 7.3 | 584 | 1.35 | 24.7 | 1,006 | 2.35 |
| 25 | 375 | 8.1 | 625 | 1.43 | 24.3 | 1,028 | 2.30 |

Although the invention has been described with preferred embodiments it is to be understood that variations and modifications may be employed without departing from the concept of the invention as defined in the following claims.

We claim:

1. A melt processable polyester capable of forming an anisotropic melt phase at a temperature below approximately 400° C. consisting essentially of the recurring moieties I, II, III, and IV wherein:

which is capable of undergoing melt processing at a temperature in the range of approximately 320° to 390° C.

4. A melt processable polyester according to claim 1 which exhibits an inherent viscosity of at least 0.6 when dissolved in a concentration of 0.1 percent by weight in pentafluorophenol at 60° C.

5. A melt processable polyester according to claim 1 which exhibits an inherent viscosity of at least 1.0 when dissolved in a concentration of 0.1 percent by weight in pentafluorophenol at 60° C.

6. A melt processable polyester according to claim 1 which exhibits an inherent viscosity in the range of approximately 6 to 9 when dissolved in a concentration of 0.1 percent by weight in pentafluorophenol at 60° C.

7. A melt processable polyester according to claim 1 which exhibits a melt viscosity in the range of approximately 800 to 1500 poise at 370° C. and a shear rate of 10 sec.$^{-1}$.

8. A melt processable polyester according to claim 1 wherein the aromatic rings of moieties I, II, III, and IV are substantially free of ring substitution.

9. A fiber which has been melt spun from the polyester of claim 1.

10. A film which has been melt extruded from the polyester of claim 1.

11. A molded article comprising the melt processable polyester of claim 1.

12. A molding compound comprising the melt processable polyester of claim 1 which incorporates approximately 1 to 60 percent by weight of a solid filler and/or reinforcing agent.

13. A melt processable polyester capable of forming an anisotropic melt phase at a temperature below approximately 400° C. consisting essentially of the recurring moieties I, II, III, and IV wherein:

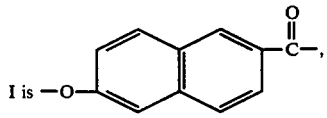

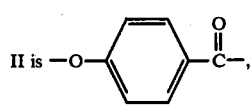

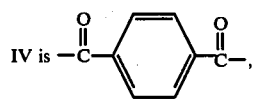

where aromatic rings of moieties III and IV optionally may include substitution of at least some of the hydrogen atoms present upon an aromatic ring selected from the group consisting of an alkyl group of 1 to 4 carbon atoms, an alkoxy group of 1 to 4 carbon atoms, halogen, phenyl, and mixtures of the foregoing, and wherein said polyester comprises approximately 5 to 10 mole percent of moiety I, approximately 50 to 65 mole percent of moiety II, approximately 12.5 to 22.5 mole percent of moiety III, and approximately 12.5 to 22.5 mole percent of moiety IV.

14. A melt processable polyester according to claim 13 which is capable of forming an anisotropic melt phase at a temperature below approximately 370° C.

15. A melt processable polyester according to claim 13 which is capable of undergoing melt processing at a temperature in the range of approximately 320° to 390° C.

16. A melt processable polyester according to claim 13 which exhibits an inherent viscosity of at least 0.6 when dissolved in a concentration of 0.1 percent by weight in pentafluorophenol at 60° C.

17. A melt processable polyester according to claim 13 which exhibits an inherent viscosity of at least 1.0 when dissolved in a concentration of 0.1 percent by weight in pentafluorophenol at 60° C.

18. A melt processable polyester according to claim 13 which exhibits an inherent viscosity in the range of approximately 6 to 9 when dissolved in a concentration of 0.1 percent by weight in pentafluorophenol at 60° C.

19. A melt processable polyester according to claim 13 which exhibits a melt viscosity in the range of approximately 800 to 1500 poise at 370° C. and a shear rate of 10 sec.$^{-1}$.

20. A melt processable polyester according to claim 13 wherein the aromatic rings of moieites I, II, III, and IV are substantially free of ring substitution.

21. A fiber which has been melt spun from the polyester of claim 13.

22. A film which has been melt extruded from the polyester of claim 13.

23. A molded article comprising the melt processable polyester of claim 13.

24. A molding compound comprising the melt processable polyester of claim 13 which incorporates approximately 1 to 60 percent by weight of a solid filler and/or reinforcing agent.

* * * * *